United States Patent [19]
Nakagawa et al.

[11] 4,110,772
[45] Aug. 29, 1978

[54] CAMERA SHUTTER HAVING BOUND PREVENTION DEVICE

[75] Inventors: Tadashi Nakagawa; Mitsuo Koyama; Eiichi Onda, all of Yotsukaido, Japan

[73] Assignee: Seiko Koki Kabushiki Kaisha, Japan

[21] Appl. No.: 838,866

[22] Filed: Oct. 3, 1977

Related U.S. Application Data

[63] Continuation of Ser. No. 685,443, May 11, 1976, abandoned.

[30] Foreign Application Priority Data

May 14, 1975 [JP] Japan .............................. 50-63772[U]

[51] Int. Cl.² ............................ G03B 9/08; G03B 9/40
[52] U.S. Cl. ..................................... 354/246; 354/252
[58] Field of Search ................. 354/50, 258, 245, 246, 354/252

[56] References Cited

U.S. PATENT DOCUMENTS

| | | | |
|---|---|---|---|
| 3,698,304 | 10/1972 | Tenkumo | 354/258 X |
| 3,722,392 | 3/1973 | Kitai | 354/50 |
| 3,825,940 | 7/1974 | Hayami | 354/246 X |
| 3,840,885 | 10/1974 | Yoshizaki | 354/252 X |
| 3,847,476 | 11/1974 | Onda et al. | 354/252 |
| 3,946,413 | 3/1976 | Onda et al. | 354/252 X |
| 3,946,414 | 3/1976 | Kitai | 354/245 X |

Primary Examiner—Donald A. Griffin
Attorney, Agent, or Firm—Robert E. Burns; Emmanuel J. Lobato; Bruce L. Adams

[57] ABSTRACT

A camera shutter has a set of shutter blades movable from an initial closed position in which the blades close an exposure aperture to an open position opening the exposure aperture and then to a final closed position again closing the exposure aperture. Opening and closing driving members sequentially drive the shutter blades from the initial closed position to the open position and then to the final closed position to effect an exposure. A cocking mechanism coacts with the opening and closing driving members for cocking the camera shutter to move the shutter blades from the final closed position to the initial closed position in readiness for taking an exposure. A rebound preventing device is provided for preventing rebound of the shutter blades after reaching their final closed positions and comprises a notched pin on a lever of the cocking mechanism engageable with a hook portion of the closing drive member to thereby prevent rebounding of the shutter blades. During cocking of the camera shutter, the cocking mechanism disengages from the opening and closing driving members which are thereafter free to effect an exposure.

4 Claims, 5 Drawing Figures

CAMERA SHUTTER HAVING BOUND PREVENTION DEVICE

This is a continuation of application Ser. No. 685,443, filed May 11, 1976 and now abandoned.

BACKGROUND OF THE INVENTION

This invention relates to an improvement in or relating to a bound prevention device for a camera shutter.

Shutter blades for opening and closing a film exposure window or aperture are so operated as to move at a high rate of speed and thereafter stop quickly and therefore the shutter blades or associated blade-actuating members are susceptible to bound due primarily to their inertia, resulting in double exposure on the film. Various attempts have been made to eliminate this problem. One such attempt is disclosed in Utility Model No. 50-19437 laid open to public inspection and filed by the present applicant. This invention is directed to an improvement of the above Utility Model, the improvement providing a device capable of preventing accidental operation and of operating properly even when handled inadequately.

More specifically, the device prevents bound by stopping a shutter aperture closing member at its terminal position at the completion of its stroke. An opening member holds a charge member at the terminal position, and an engagement portion on the charge member engages and holds a closing member, thereby preventing the bound of the closing member. The engagement is forcibly released when the parts move into their charged position.

BRIEF DESCRIPTION OF THE DRAWINGS

The drawings show a preferred embodiment according to this invention.

DETAILED DESCRIPTION OF PREFERRED EMBODIMENT

Figure 1:
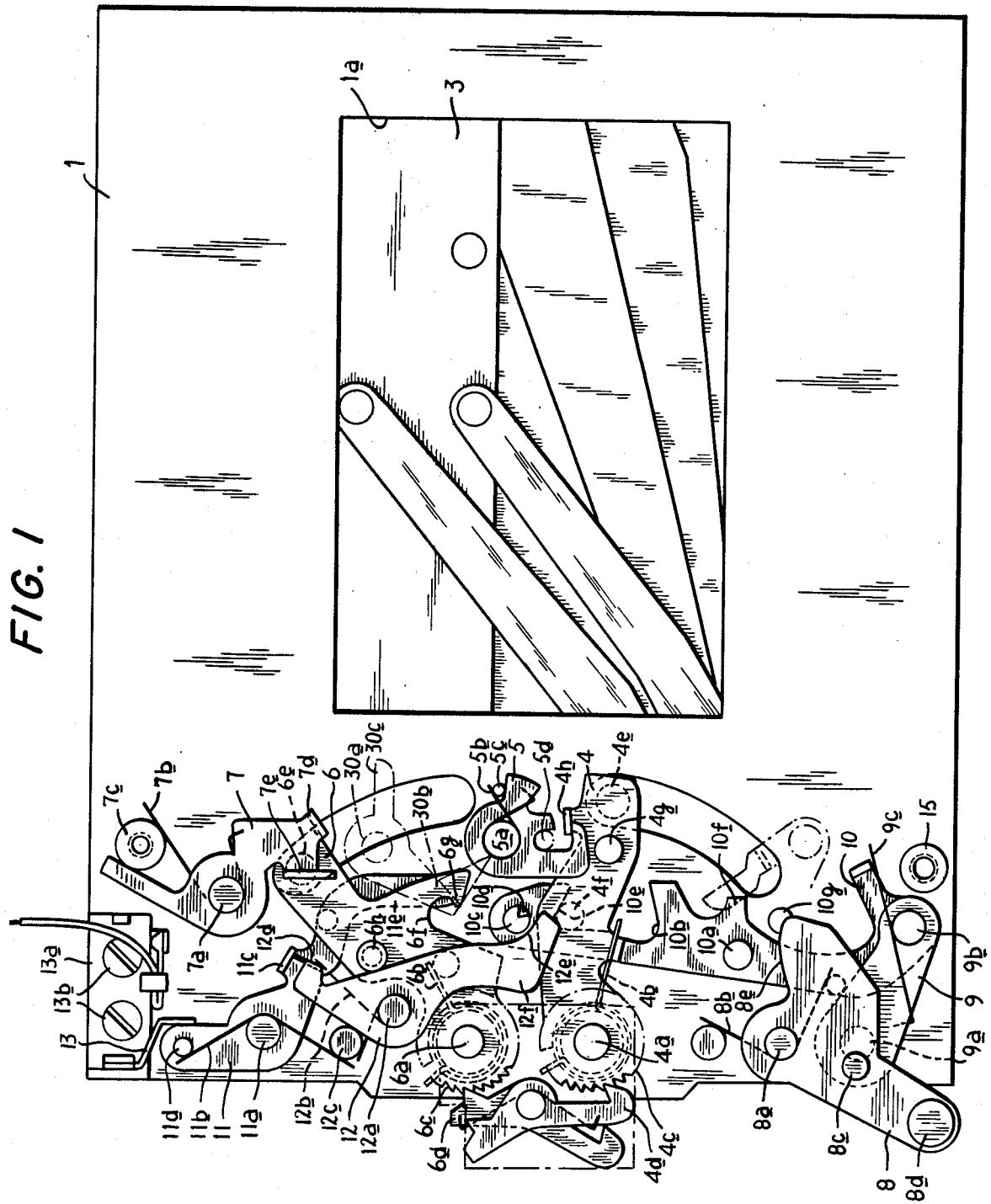
FIG. 1 is a plan view of a shutter blade actuating arrangement, showing the parts in a shutter charged or cocked position.

A preferred embodiment applied to a focal plane shutter will now be described. In FIG. 1, there is shown a shutter baseplate 1 having an aperture 1a formed therein for exposing films. FIG. 1 shows parts in a shutter-charged position where the aperture is closed off by a plurality of opening blades for starting exposure, the aperture being closed off by a plurality of closing blades (not shown) for terminating the exposure when the parts are in an exposure-completed position.

At the left of the aperture, an opening member 4 is mounted for rotation about a pin 4a and normally biased to rotate thereabout in the clockwise direction as viewed in FIG. 1 by a spring 4b. A ratchet wheel 4c and pawl 4d are provided to control and adjust the biasing forces of the spring. The opening member 4 has a downwardly projecting roller 4e connected to the opening blades 3 by conventional means. The opening member 4 also has a downward projection 4f, an upward projection 4q and an upturned flange 4h which is engaged by a hook member 5. The hook member 5 is mounted on the shutter plate 1 for rotation about a pin 5a and normally biased to rotate thereabout in the counterclockwise direction by a spring 5b. The hook member 5 is held in abutting engagement with a fixed pin 5c with the hook member engaging the upturned flange 4h of the opening member. The hook member is provided with a recess 5d for use in operating the opening member.

At the left of the aperture, a closing member 6 is mounted for rotation about a pin 6a and normally biased to rotate thereabout in the clockwise direction by a spring 6b. A ratchet wheel 6c and pawl 6d are provided to control and adjust the biasing forces of the spring. The closing member 6 has a downwardly projecting roller 6e connected to the closing blades by conventional means. The closing member 6 also has a charge recess 6f a bound prevention hook 6q and an upwardly and downwardly extending projection 6h. The closing member 6 is engaged at its right-hand portion by a hook member 7. The hook member 7 is pivoted to the shutter baseplate 1 by a pin 7a and normally biased clockwise by a spring 7b into abutment with a fixed pin 7c. The hook member 7 is also provided with a downward flange 7d for engagement with the closing member and with an upturned flange 7e for manipulation of the hook member 7.

A cocking lever 8 is pivoted to the shutter baseplate 1 by a pin 8a and normally biased to rotate thereabout clockwise by a spring 8b. The cocking lever 8 has an upwardly extending projection 8c which is held in the illustrated position to serve as a stop as described later. The cocking lever 8 also has a manipulating pin 3d and a cam surface 8e.

A guide baseplate 9 is pivoted to the shutter plate 1 by a pin 9a and has at its free end a charge member 10 mounted for pivotal movement thereon. A spring 9c is provided to urge the charge member 10 in the counterclockwise direction.

The charge member 10 has an upwardly extending roller 10a which can engage the cam surface 8e, a recess 10b which can raise the projection 4f in the upward direction as viewed in the drawing, and an upward projection 10c which can raise the recess 6f of the closing member 6 in the upward direction of the drawing. The projection 10c has a cutout 10d engageable with the hook 6g. The charge member 10 is lowered by the spring 9c in the illustrated charge position with a recess 10e held in place against the pin 4f. When the operation of the charge member 10 is completed, a protrusion 10f is prevented from being lowered by a fixed pin 10q.

A conductive lever 11 is pivoted to the shutter baseplate 1 by a pin 11a and normally biased to rotate thereabout clockwise by a spring 11b to maintain an upturned flange 11c in engagement with a hook member 12. The conductive lever 11 is provided with an upward projection 11d serving as an electric contact and a cam arm 11e engageable with the projection 6h of the closing member 6 and with the charge member 10.

The hook lever 12 is pivoted to the shutter baseplate 1 by a pin 12a and is normally biased by a spring 12b to rotate thereabout in the counterclockwise direction and stopped by engagement with a fixed pin 12c. The hook lever 12 has a downward flange 12d engaging with the flange 11c, an arm 12e engaging with the upward projection 10c of the charge member 10, and a convex portion 12f.

A contact plate 13 is fixed to the shutter baseplate 1 by screws 13b and electrically insulated from other component members by an insulating plate 13a. The contact plate 13 extends into the passage of movement of the upward projection 11d.

Figure 2:
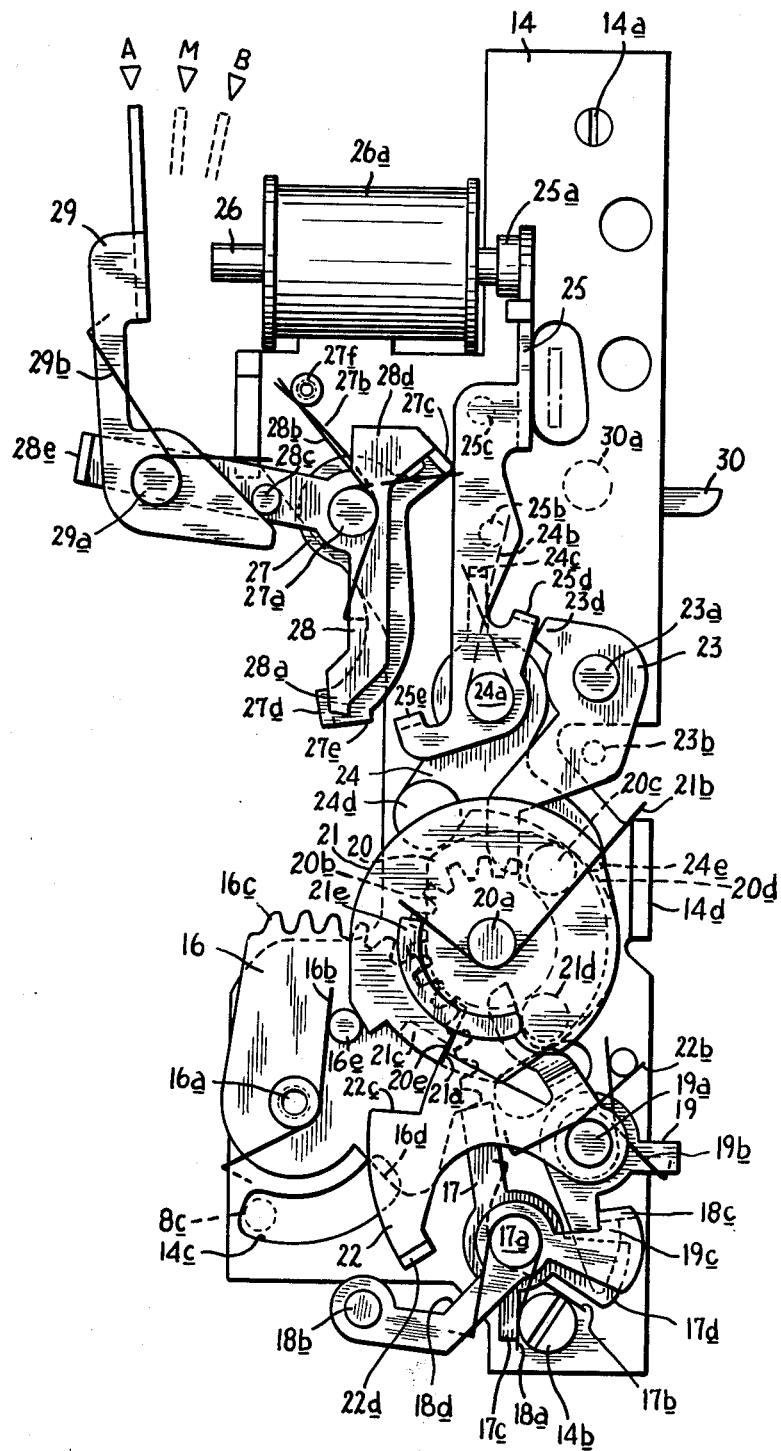
FIG. 2 is a plan view of a mechanism placed over the arrangement shown in FIG. 1.

FIG. 2 shows a mechanism provided over the arrangement shown in FIG. 1 and at the left end portion of the shutter baseplate 1, the mechanism being supported on a base plate 14. The base plate 14 is secured to pins 7c and 15 fixed on the shutter baseplate 1 by screws 14a and 14b, respectively.

A charge gear 16 is pivoted to the base plate 14 by a pin 16a and normally biased by a spring 16b to rotate thereabout in the clockwise direction as viewed in FIG. 2. The charge gear 16 is held in the illustrated position by engagement of a portion of a toothed peripheral portion 16c with a hook member 17. The charge gear 16 has a charge end portion 16d engageable with the upward projection 8c of the cocking lever 8 which extends upwardly through an arcuate hole 14c in the base plate 14.

The hook lever 17 is pivoted to the base plate 14 by a pin 17a and normally biased by a spring 17b to rotate thereabout in the counterclockwise direction with an arm 17c engaging the screw 14b. The hook lever 17 has an actuating arm 17d extending rightward.

A synchronizing lever 13 is rotatably fitted over the pin 17a and is normally biased by a spring 18a to rotate thereabout in the clockwise direction. The synchronizing lever 18 is provided at left-hand end with a contact projection 18b having an electrically conductive portion and at righthand end with a downward flange 18c which is engageable with the actuating arm 17d of the hook lever 17 and is engaged by a release lever 19 in the illustrated charge position.

The release lever 19 is pivoted to the base plate 14 by a pin 19a and normally biased by a spring 19b to rotate thereabout in the counterclockwise direction with a hook portion 19c engaging the downward flange 18c of the synchronizing lever 18.

Figure 3:
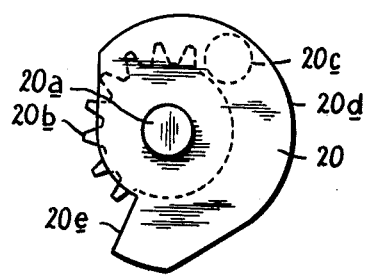
FIGS. 3 and 4 are views illustrating certain parts of FIG. 2.

A toothed portion 20b of a first cam wheel 20 which meshes with the toothed portion 16c of the charge gear 16 is pivoted to the base plate 14 by a pin 20a and formed integrally with the first cam wheel 20 and a downward projection 20c (FIG. 3). The first cam wheel 20 has at its periphery a cam surface 20d having a radius which increases in increments as the wheel 20 rotates counterclockwise and a protrusion 20e having a straight end face.

Figure 4:
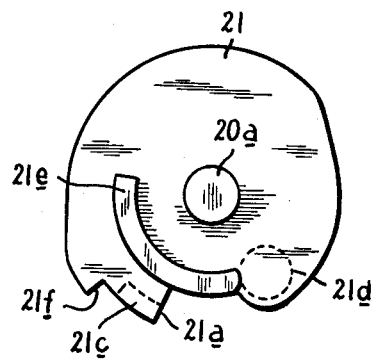
Figure 5:
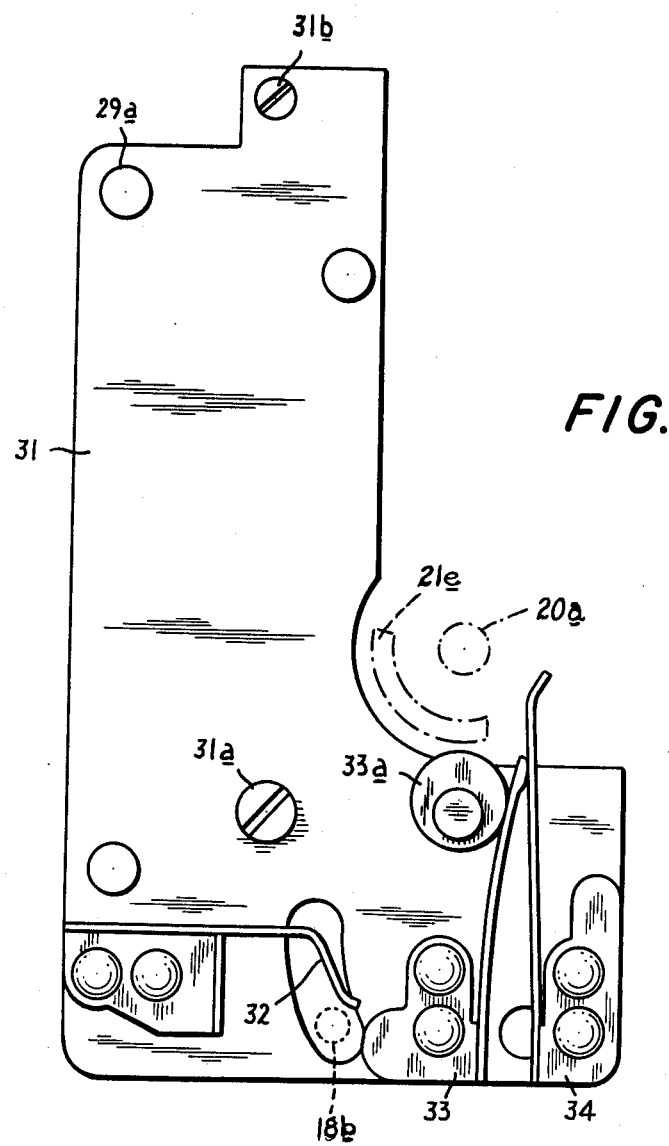
FIG. 5 is a plan view of a part placed over the mechanism of FIG. 2.

Over the pin 20a, there is fitted a second cam wheel 21 which is normally biased to rotate about the pin 20a in the counterclockwise direction with an engaging edge 21a engaged by a hook lever 22. The second cam wheel 21 is shown in FIG. 4 and has a downward projection 21c engaging the protrusion 20e of the first cam wheel 20, a downward projection 21d of circular cross-section, an upwardly extending arcuate projection 21e, and a stop protrusion 21f engageable with a flange 14d of the base plate 14.

The hook lever 22 is rotatably fitted over the pin 19a and normally biased by a spring 22b to rotate thereabout in the clockwise direction. A downward flange 22a extends into the passage of movement of the upward projection 4g of the opening member 4 for engagement therewith (FIG. 1). The hook lever 22 has an end face 22c extending into the passage of movement of the upward projection 16e of the charge gear 16 and a free end portion 22d located at the area where the movement of a recess 18d of the synchronizing lever 18 is stopped.

An operating lever 23 is mounted for movement about a pin 23a with a downward projection extending into the recess 5d of the hook member and with an arm 23c at one end extending into the passage of movement of the downward projection 21d of the second cam wheel 21. The operating lever 23 has at the other end a stepped portion 23d formed thereon.

A spring-biased lever 24 is pivoted to the base plate 14 by a pin 24a and has three arms. The lever 24 is provided with a first arm with a flange 24c with which both ends of a spring 24b engages in sandwiching relation thereto, with a second arm with a roller 24d engaging the cam surface 20d of the first cam wheel, and with a third arm with a cammed surface 24e engaging the downward projection 20c of the first cam wheel.

An armature lever 25 is rotatably fitted over the pin 24a and has at one, free end a magnetic member 25a mounted thereon and intermediate between the pin 24a and magnetic member 25a a downward projection 25b on which the spring 24b acts. The armature lever 25 is also provided with a downward projection 25c engaging the manipulating flange 7e of the hook member 7, a downward flange 25d engaging the stepped portion 23d of the operating lever 23, and an engaging flange 25e.

An electro-magnet 26 is fixed to the base plate 14 and its coil winding 26a is connected with a conventional electronic timing circuit.

A mechanical time lever 27 is pivoted to the base plate 17 by a pin 27a and normally biased by a spring 27b to rotate thereabout in the counterclockwise direction with a flange 27c held in abutting relation to a bulb lever 28. The lever 27 has a downward flange 27d extending into the area where the convex portion 12f of the hook lever 12 operates, and an end portion 27e engageable with the engaging flange 25e of the armature lever 25.

The bulb 28 is rotatably fitted over the pin 27a and normally biased by a spring 28b to rotate thereabout in the counterclockwise direction with an upward projection 28c abutting against a transforming lever 29. The bulb lever 28 has a stepped portion 28a which is also engageable with the flange 25e of the armature lever. The bulb lever is also provided with an arm 28d engaging with the flange 27c of the mechanical time lever and a bulb actuating portion 28e.

The transforming lever 29 is pivoted to a subsidiary plate 31 by a pin 29a and normally biased by a spring 29b to rotate thereabout in the clockwise direction. The lever 29 is operatively interlocked with a manual shifting dial of a camera by conventional means and is shiftable among automatic "A", manual "M" and bulb "B" positions.

A signal lever 30 is pivoted below the base plate by a pin 30a and has at one end an arm 30b engageable with the upward projection 6b of the closing member 6 and at the other end an arm 30c which is an output of a down signal of a reflex mirror of a camera not shown.

The subsidiary plate 31 is placed at an upper portion of the mechanism of FIG. 2 and fixed to the pins 16a and 27 by screws 31a and 31b, respectively. An FP contact plate 32 is secured in electrically insulated relationship to other members and curved to extend into the area where the contact projection 18b of the synchronizing lever 18 operates. A pair of contacting members 33 and 34 which constitute a trigger switch of the electronic timing circuit (not shown) are secured to the subsidiary plate 31 in insulated relation to the latter and form a contact by their distal ends. The contacting member 33 is adjustable by an insulated adjustment pin 33a mounted on the subsidiary plate 31. The contacting member 34 extends into the area adjacent the arcuate projection 21e of the second cam wheel 21. The contact is opened by rotative movement of the insulated projection 21e. The mode of operation of a shutter thus constructed will now be described.

When the transforming lever 29 is in the position of automatic "A" shown in FIG. 2, a camera button not shown is depressed to release the mirror and the degree of diaphragm opening is determined. When the shutter release lever 19 is rotated clockwise against the force of the the spring 19b, the synchronizing lever 18 is rotated clockwise upon release of the flange 18c from the hook portion 19c. The contact projection 18b at the left-hand end of the lever is brought into contact with the curved portion of the FP contact plate 32 to render the contact electrically conductive for lighting a conventional flash lamp. Upon continued rotation of the synchronizing lever 18, the downward flange 18c becomes engaged with the actuating arm 17d of the hook lever 17 to turn the latter clockwise against the bias of the spring 17b, thereby releasing the upward projection from engagement with the charge gear 16. The charge gear 16 is rotated clockwise by the spring 16b to turn counterclockwise the toothed portion 20b of the first cam wheel 20 which meshes with the toothed portion 16c. With the counterclockwise rotation of the first cam wheel 20, the downward projection 20c releases the pressing engagement of the cammed surface 24e of the spring-biased lever 24 with the projection 20c. The spring-biased lever 24 is then released from the biasing force of the spring 24b which would otherwise be forced at one end leftward by the flange 24c and cause at the other end the downward projection 25b to press the magnetic member 25a on the free end of the armature lever 25 against the electro-magnet 26.

The first cam wheel 20 revolves counterclockwise by the spring 16b of the charge gear 16 to enable the cam surface 20d to raise the roller 24d of the spring-biased lever 24 gradually, thereby rotating the spring-biased lever 24 clockwise. At this time, the electronic circuit is supplied with electric current by conventional means upon depression of the camera button and hence, the electro-magnet 26 is already energized. With the continued clockwise rotation of the spring-biased lever 24, the flange 24c urges the afore-mentioned one end of the spring 24b leftward and the afore-mentioned other end of the spring causes the downward projection 25 to urge the armature lever 25 rightward. However, since the magnetic member 25a is attracted to the electro-magnet 26, the spring 24b continues being biased. Further clockwise rotation of the charge gear 16 enables the projection 16e to push the end face 22c of the hook member 22 so as to release the latter from engagement with the second cam wheel 21.

The second cam wheel 21 is turned counterclockwise by the spring 21b to cause the arcuate projection 21e to actuate the trigger switch 34 for the electronic circuit out of contact with the contacting member 33, thus initiating the counting by the electronic circuit. When the second cam wheel is about to finish its operation, the downward projection 21b pushes the arm 23c of the operating lever 23 and the recess 5d of the hook member 5 leftward in which recess the downward projection 23b extends, in order to rotate the hook member 5 clockwise. When the downward projection 21d of the second cam wheel is stopped, the stepped portion 23d of the operating lever 23 is retracted out of the passage of movement of the downward flange 25d of the armature 25 and, before this, the hook member 5 releases the flange 4h of the opening member 4. The opening member 4 is rotated in the clockwise direction by the spring 4b to actuate the opening blades 3 by the downward projection 4e in the well known manner so as to open the exposure window 1a. When the operation of the opening member 4 nearly finishes, the downward projection 4f depresses the recess 10b of the charge member 10 and the upward projection 10c engages the arm 12e of the hook lever 12 to turn the latter clockwise against the biasing force of the spring 12b. The conductive lever 11 which is engaged by the downward flange 12d is disengaged by clockwise rotation of the operating lever 12 and then, is rotated clockwise by the spring 11b, the contacting portion 11d contacting the contact plate 13 to illuminate the X class flash lamp. This type of flash lamp and the aforementioned FP flash lamp are well known in the art and thus the explanation about how to select and use these lamps is omitted for the sake of brevity.

When the operation of the opening member 4 is nearly terminated, the upward projection 4g engages the downward flange 22a of the hook lever 22 to rotate the latter in the counterclockwise direction, the flange 22d being caused to turn the synchronizing lever 18 until the flange 18c engages the hook portion 19c of the release lever. The opening member 4, after travelling to the terminating end of the exposure window 1a, is stopped at a position where it abuts against the projection 10g, the downward projection 4f holding the recess 10b of the charge member in locked relation.

After passing of the desired exposure time, the electronic circuit stops supplying electric current to the coil 26a of the electro-magnet, the electro-magnet 26 is de-energized, and the magnetic member 25a being no longer attracted by the electro-magnet allows the armature lever 25 to be rotated clockwise by the spring 24b.

When the operation of the armature lever 25 is about to be terminated, the downward projection 25c pushes the flange 7e of the hook member 7 to rotate the latter counterclockwise, so that the closing member 6 is released which is engaged by the downward flange 7d. The closing member 6 is turned clockwise by the spring 6b, the downward projection 6e operating the closing blades to close the exposure window 1a. The operation of the closing member 6 causes the lower part of the projection 6h to engage the cam arm 11e of the conductive lever 11, the latter being rotated counterclockwise against the resistance of the spring 11b to retract the contacting portion 11d away from the contact plate 13. Furthermore, the upper part of the projection 6h engages with the arm 30b of the signal lever 30 to rotate the latter in the counterclockwise direction, the arm 30c actuating a mirror member (not shown). When the closing member 6 comes into abutment with the fixed pin 5c after its operation, the hook portion 6q of the closing member 6 is engaged in the cutout 10d formed in the projection 10c of the charge member and is held in place, so that the closing member 6 is prevented from bounding or bouncing or rebounding which would otherwise be caused when it impinges on the fixed pin 5c during high speed operation. Thus, the exposure operation is completed without rebound of the rapidly moving parts. The manner in which the shutter is charged will be described.

When the cocking lever 8 is rotated counterclockwise against the bias of the spring 8b, the upward projection 8c enables the charge gear 16 to rotate counterclockwise against the bias of the spring 16b so as to turn the first cam wheel 20 clockwise, the first cam wheel 20 having the toothed portion 20b meshing with the toothed portion 16c. The end face 20e pushes the downward projection 21c of the second cam wheel 21 to turn the latter clockwise against the resistance of the spring 21b. The cam surface 8e of the cocking lever 8 engages the roller 10a of the charge member 10 to raise the latter. Being supported on the guide plate 9, the charge member 10 is raised against the biasing force of the spring 9c. The recess 10b engages the downward projection 4f of the opening member 4 and the upward projection 10c engages the recess 6f of the closing member 6, thereby rotating the opening member 4 and closing member 6, respectively.

Since the arm 12e of the operating lever 12 is disengaged from the projection 10c during earlier operation of the charge member 10, the operating lever 12 revolves counterclockwise by the spring 12b and, before the projection 6h of the closing member 6 is disengaged from the conductive lever 11, the lever 12 allows the conductive lever 11 to be stopped at a position where the contacting portion 11d does not close the contact. Continued advancing movement of the charge member 10 enables the downward projection 6h to become disengaged from the cams arm 11e of the conductive lever 11 and, at the same time, enables its top periphery to engage the cam arm 11e of the conductive lever 11 so as to rotate the latter counterclockwise.

At the final stage of operation of the cocking lever 8, the flange 4h of the opening member 4 is engaged by the hook portion of the hook member 5 and the closing member 6 by the flange 7d of the hook member 7 as shown in FIG. 1. Simultaneously, the last tooth of the toothed portion 16c of the charge gear 16 is engaged by the hook lever 17 and the engaging edge 21a of the second cam wheel 21 by the hook lever 22 as shown in FIG. 2. During return travel of the cocking lever 8, when the roller 10a is lowered in follow-up relation to the cam portion 8e, the projection 10c escapes from the hook 6q with the arm 11e urging the projection 10c leftward so that the cutout 10d will not be engaged by the hook 6q.

Next, the description will be directed to the case where the transforming lever 29 is shifted from the FIG. 2 position to the "M" position.

When the power cell for an electronic shutter runs out, or when a desired interval of time of exposure is required rather than automatic exposure using an electronic shutter, there is provided the "M" position for the transforming lever 29 to enable mechanical exposure time control, the lever 29 being capable of manipulation from the outside of the camera. With the camera released, after a series of operations are carried out in the camera as stated before, the release lever 19 is actuated and then the synchronizing lever 18 and charge gear 16 are actuated. In this situation, the electronic circuit is not actuated generally and hence, the electromagnet is de-energized. Therefore, when the first cam wheel 20 is rotated to move the springbiased lever 24, the armature lever 25, being not attracted to the electromagnet 26 by the magnetic member 25a, is turned clockwise with the downward flange 25d being engaged by the stepped portion 23d of the operating lever 23. When the hook lever 22 is operated to rotate the second cam wheel 21 counterclockwise at the final stage of the charge gear 16, the trigger switch 34 is actuated. However, the actuation of the trigger switch 34 has no effect because the electronic circuit is not operated. Further counterclockwise rotation of the second cam wheel 21 enables the downward projection 21a to actuate the operating lever 23 for operating the hook member, the opening member 4 being actuated to operate the opening blades 3 and open the exposure window 1a.

The operating lever 23 is further turned clockwise, whereupon the downward flange 25d of the armature lever 25 is released from the stepped portion 23d.

However, when the transforming lever 29 is in the "M" position, the projection 28c of the bulb lever 28 is rotated counterclockwise by the spring 28b in follow-up relation to the transforming lever 29, so that the flange 27c of the mechanical time lever 27 is disengaged by the arm 28d and the time lever 27 is rotated counterclockwise by means of the spring 27b. The stepped portion 28a of the bulb lever 28 does not still reach the area where the flange 25e of the armature lever 25 operates. However, since the end portion 27e of the mechanical time lever 27 enters the area where the flange 25e operates, when the flange 25d is released from the stepped portion 23d of the operating lever 23, the flange 25e is engaged by the end portion 27e of the mechanical time lever 27. At the final stage of operation of the opening member 4, the charge member 10 is lowered and the projection 10c rotates the operating lever 12 clockwise, whereupon the convex portion 12f pushes the downward flange 27d of the mechanical time lever 27 in the leftward direction to take the end portion 27e out of the area where the flange 25e operates, so that the armature lever 25 is rotated clockwise by the spring 24b to operate the closing member 6 as in the foregoing explanation, thus finishing the exposure. It is the same as in the foregoing explanation that the conductive lever 11 is actuated to close the contact 11d after the opening member 4 is operated.

Another mode of operation where the transforming lever 29 is shifted to the "B" position shown in FIG. 2 will be described. If a relatively long interval of exposure time is necessary instead of the afore-mentioned two examples, bulb operation, that is, the operation in which exposure operation is initiated by depressing a release button and terminated by returning the latter, is required. In this instance, the transforming lever 29 is switched to the "B" position.

When the transforming lever 29 is turned clockwise to the "B" position, the bulb lever 28 is rotated by the spring 28b with the projection 28c in follow-up relation to the transforming lever 29, until the stepped portion 28a reaches the area where the flange 25e of the armature lever 25 operates.

When the camera is released in this instance, the shutter is operated while the electro-magnet 26 is not actuated, as in the foregoing case where the transforming lever 29 is in the "M" position. The flange 25d of the armature lever 25 is released from the stepped portion 23d of the operating lever 23 and the flange 25e is engaged by the end portion 27e of the mechanical time lever 27. When the mechanical time lever 27 is actuated in response to the actuation of the opening member 4 and the flange 25e is disengaged from the end portion 27e, the stepped portion 28a of the bulb lever 28 engages the flange 25e. After the passing of a desired interval of exposure time, upon the return of the camera button, the flange 28e of bulb lever 28 is returned in the upward direction as viewed in the drawing in the well known manner. The bulb lever 28 is turned clockwise against the force of the spring 28b and the stepped portion 28a is pivoted out of the area where the flange 25e operates, the armature lever 25 rotating clockwise to finish the exposure.

It is possible to provide the charge member 10 with the bound prevention arrangement for the opening member 4 and to restrict the charge member as by the cocking lever 8 or first cam wheel 20. It is also possible to provide the cocking lever 8 with the bound prevention arrangement for the opening member and to restrict the cocking lever 8 by the first cam wheel 20.

In the illustrated example, to return the synchronizing lever 18, the projection 4g of the opening member 4 actuates the flange 22a of the hook member 22 and the synchronizing lever 18 is rotated counterclockwise by the flange 22d. However, the operated charge gear 16 may return the synchronizing lever 18 directly or via the hook member 22.

While the embodiment has been described as being applied to a focal-plane shutter type mechanism, it is also applicable to a lens shutter having opening and closing members.

As is apparent from the foregoing description, when the second cam wheel 21 is released, all additional operations related to exposure operation have been completed. The second cam wheel 21 is directed merely to the operation of the trigger switch for the electronic circuit and to the operation related to the release of the opening member 4 and these relate only to the direct exposure actuation. The device of the invention makes it possible to control the exposure time to precision as compared with prior art devices in which the second cam wheel is arranged to carry out the operation that is not related directly to exposure and hence, is subjected to a larger load. Furthermore, there may be used triggering switches 33, 34 in which the trigger takes place by a normally opened type switch or a normally closed type switch.

As described above, according to the invention, the hook 6g is engaged in the cutout 10d in the charge member and held in position to prevent the bound of the closing member 6. Nevertheless, for shutter charging, the charge member 10 and the closing member 6 are advanced in interengaged relation in the charging position and returned with the conductive lever 11 moved in a direction to disengage the charge member from the closing member. The device of the invention can prevent the bound without fail and produce no variations in charge torque.

What is claimed is:

1. In a camera shutter having an exposure aperture; shutter blades operable from an initial closed position closing said exposure aperture to an open position opening said exposure aperture and then to a final closed position to effect an exposure; operating means including relatively displaceable opening and closing driving members for sequentially driving said shutter blades from said initial closed position to said open position and then to said final closed position; cocking means coacting with said operating means for cocking the camera shutter and effecting movement of said shutter blades from said final closed position to said initial closed position; and rebound preventing means for preventing rebound of said shutter blades after reaching their final closed position, said rebound preventing means comprising means on said cocking means for engaging and releasably interlocking with said closing driving member during driving movement of said closing driving member to move said shutter blades to their final closed position to thereby prevent rebounding of said shutter blades.

2. A camera shutter according to claim 1; wherein said means on said cocking means comprises a notched pin on said cocking means engageable with a hook portion of said closing driving member.

3. A camera shutter according to claim 1; wherein said cocking means includes means for effecting disengagement of said first and second means from said opening and closing driving members during cocking of the camera shutter.

4. A camera shutter according to claim 3; wherein said means on said cocking means comprises a notched pin on said cocking means engageable with a hook portion of said closing driving member.

* * * * *